March 30, 1965
W. GROBMAN ETAL
3,175,779
ROLL LIFT SHAFT MOUNTING
Filed Dec. 19, 1962
3 Sheets-Sheet 1
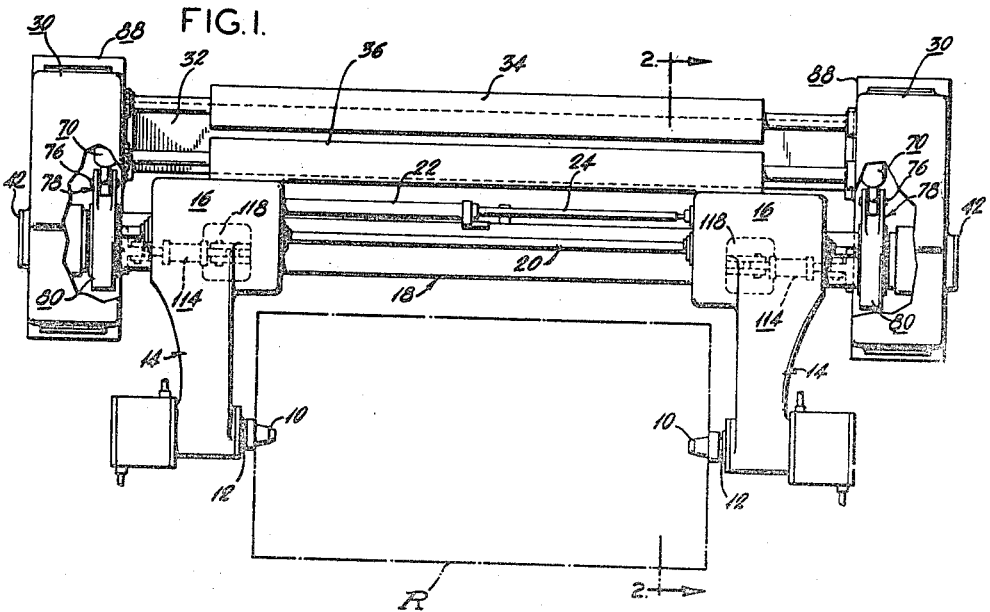
INVENTORS.
WILLIAM GROBMAN
IRVING KESTENBAUM
HENRY W. MOSER
BY Howson & Howson
ATTYS.

March 30, 1965 W. GROBMAN ETAL 3,175,779
ROLL LIFT SHAFT MOUNTING
Filed Dec. 19, 1962 3 Sheets-Sheet 2
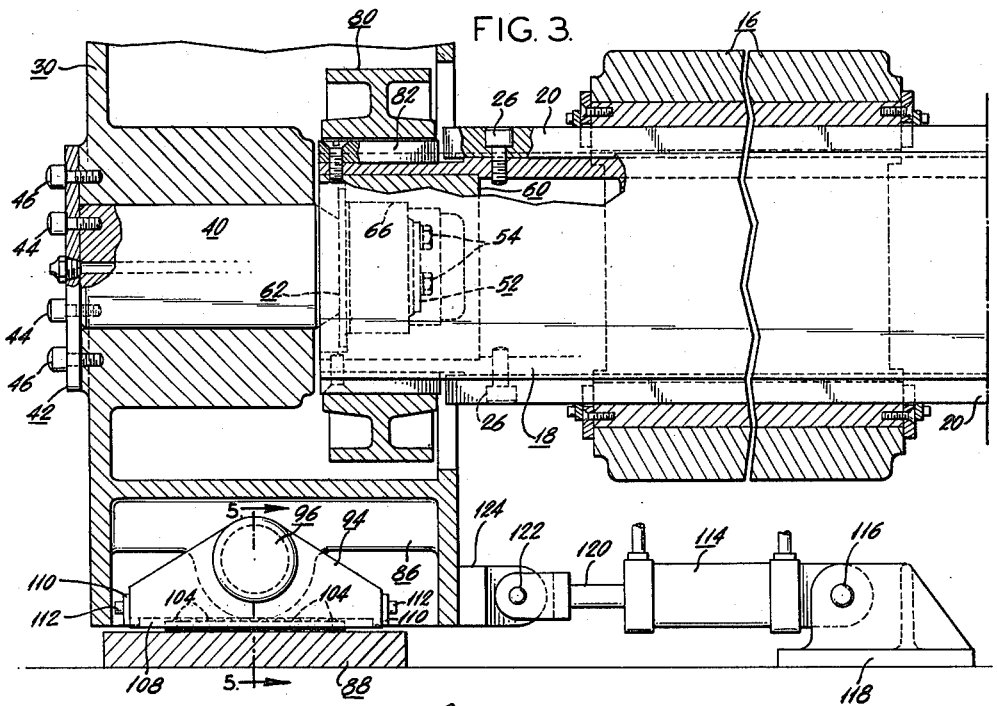
INVENTORS
WILLIAM GROBMAN
IRVING KESTENBAUM
HENRY W. MOSER
BY Howson & Howson
ATTYS.

3,175,779
ROLL LIFT SHAFT MOUNTING

William Grobman, Philadelphia, Pa., and Irving Kestenbaum, Cherry Hill, and Henry W. Moser, Haddonfield, N.J., assignors to Samuel M. Langston Company, Camden, N.J., a corporation of New Jersey
Filed Dec. 19, 1962, Ser. No. 245,888
3 Claims. (Cl. 242—58.6)

The present invention relates generally to a roll lift shaft mounting, as for mill roll stands of the type disclosed in Patent Nos. 2,991,953 and 3,052,422 to Moser et al., and has for an object the provision of improvements in this art.

The apparatus with which the present invention is associated comprises a horizontal roll lift shaft, either solid or tubular, which is supported at each end in a side frame, as of a mill roll stand, and a pair of roll supporting arms splined for axial movement on the shaft, the arms each carrying a roll lifting and supporting spindle with a roll core-engaging spindle cone chuck. The cone chucks extend inwardly toward each other on a common horizontal axis to engage between them a roll of wound sheet material, the cone chucks and spindles providing rotation of the roll against breaking resistance when the arms are raised by the shaft to lift the roll.

Heretofore the roll lift shaft has commonly been provided with integral journals operating in bearings in the side frames and when the very heavy weight of the roll is imposed upon the arms and, through the arms upon the shaft, there is considerable bending in the shaft. This produces added friction on the journals and their bearings and also makes it difficult to slide the arms along the shaft.

The added friction in the journal bearings increases the power needed to lift the roll, makes it necessary to perform precision fitting of the journals in the bearings, and increases the power needed to shift the shaft endwise—when that is done to provide web edge positioning control.

The added friction in the splined hub of the arms on the shaft makes it more difficult to move the arms along the shaft—when this mode of securing web edge positioning control is used.

The bending of the shaft also exerts a tilting effect on the side frame and if the side portion of the frame on which the roll shaft is mounted is not made separately from the portions of the frame which support other operating elements, the operation of such other elements is adversely affected.

With the above-mentioned and other considerations in mind, it is one of the particular objects of the invention to provide a roll shaft mounting which will greatly reduce the journal bending loads and transform them to principally shear loads.

Another object is to substantially eliminate the bending or tilting of the frame sides.

Another object is to provide separate frame side members for carrying the roll shaft and connecting them together as a rigid unit which is mounted for transverse movement to provide roll edge registry adjustment without shifting the roll supporting arms along the shaft or shifting the shaft endwise in the side frame bearings.

Another object is to provide roll shaft mountings which are of simple construction so as to be easy and relatively inexpensive to manufacture and install, easy to adjust, easy to lubricate, and which use commercial parts of known standard quality.

The above and other objects of the invention as well as various features of novelty and advantages will be apparent from the following description of an exemplary embodiment thereof, reference being made to the accompanying drawings wherein:

FIG. 1 is a top plan view of apparatus embodying the invention;

FIG. 2 is an enlarged vertical transaxial or longitudinal section taken on the line 2—2 of FIG. 1;

FIG. 3 is an enlarged partial vertical axial or transverse section taken through the shaft axis;

FIG. 5 is an enlarged vertical transaxial section taken on the line 5—5 of FIG. 3; and FIG. 6 is a vertical section taken on the line 6—6 of FIG. 5.

Figure 4:
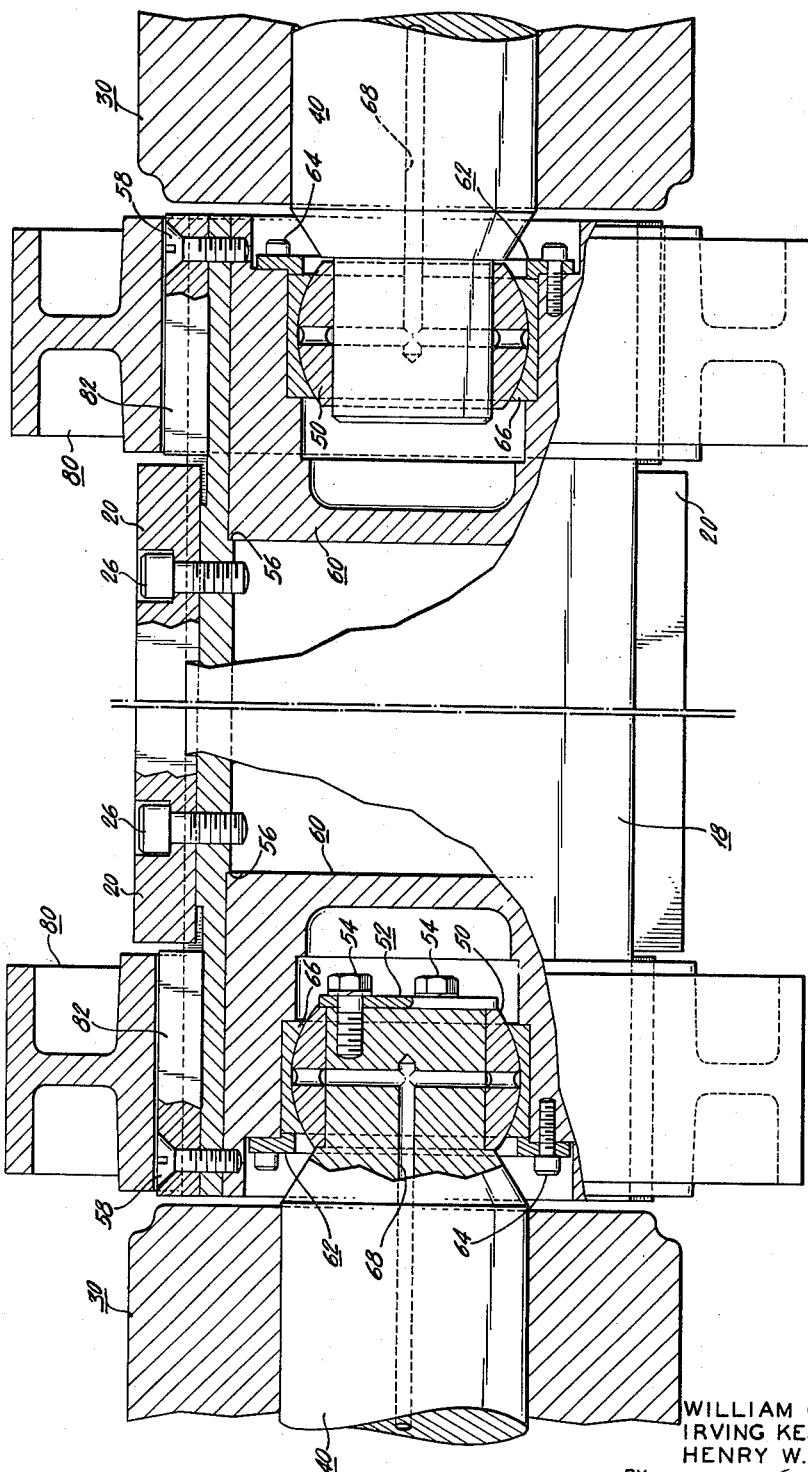
FIG. 4 is a further enlarged axial section taken on the line 4—4 of FIG. 3, the view being extended to the other end of the roll.

As shown in FIGS. 1 and 2, a part of a mill roll stand is provided for supporting a roll R, as of wound newsprint or other sheet material. The roll is provided with a tubular core which is engaged by cone chucks 10 carried by fluid-braked spindles 12 rotatably mounted in the outer end of arms 14 which are slidably mounted at their hubs 16 on a roll lift shaft 18 having splines 20 secured by cap screws 26. The splined arrangement is disclosed in Patent No. 3,052,422 and is designed to provide easy sliding movement of the arms along the shaft even under conditions of heavy loading on the arms and bending of the shaft.

The arms 14 are moved back and forth by suitable means such as a fluid operated cylinder-piston device comprising a cylinder 22 and a piston rod 24. This arrangement for moving the arms to engage or disengage the roll or shift it axially is fully disclosed in the patents referred to and only one such device is shown herein but it may be noted that one of the power elements, cylinder or piston rod, for each arm is attached to an arm and the other is attached to the shaft.

The shaft 18 at its ends is turnably mounted on roll shaft supporting side frame members 30 which herein are formed separately from the other portions of the side frames of the machine as a whole. None of the other frame portions are shown herein. In the present arrangement where side tilt of the side frames has been eliminated by the roll mounting, next to be described, the side frame members can be and are rigidly connected together, as by a strong rigid transverse tubular beam member 32. Auxiliary rolls 34 and 36 are also rotatably mounted in the side frame members 30.

As shown in FIGS. 3 and 4, the roll shaft 18 at its ends is rotatably supported in the side frames 30 by mountings which embody the features and advantages of the present invention. In close-fitting bores of the side frames 30 there are secured stub shafts 40. As shown in FIG. 3, the securement may be effected by means of cap plates 42 which are made fast to the ends of the stub shaft 40 by cap screws 44 and made fast to the side frames 30 by cap screws 46.

As shown in FIG. 4, the inner end of each stub shaft 40 has mounted thereon a spherical or ball bearing bushing 50, the ball bushing on one stub shaft being rigidly secured against axial movement, as by an end plate 52 held by cap screws 54, and the ball bushing at the other end being left free for axial movement.

The shaft 18 at each end is formed with an end recess 56 within which there is secured, as by screws 58, a recessed end plug 60. Within an end recess of the plug 60 there is secured, as by a ring plate 62 and cap screws 64, an outer spherical surfaced race ring 66 which fits on the ball bushing 50. Suitable lubrication channels, generally indicated by the reference 68, are provided in the stub shaft 40 and ball bushing 50.

By this arrangement the shaft 18 is equally supported on the spherical bearings of the stub shafts 40 and its bending will be symmetrical about its center of length even though the bending and resultant change in effective length may cause some axial sliding movement relative to the stub shaft at one end. The loading on the side frames will always be vertical and without any tilt due to bending in the roll shaft.

The shaft 18 and the arms 14 keyed thereon are turned by any suitable means such as fluid operated cylinder-piston power devices having a cylinder 70 connected by a pivot pin 72 to a side frame and a piston rod 74 connected by a pivot pin 76 to a crank arm 78 carried by a sleeve 80 which is mounted on splines 82 secured to the shaft by the screws 58 previously noted as also securing the plug 60.

For securing web edge adjustment means are provided which cooperate with the roll shaft mounting herein provided which does not provide axial movement of the roll shaft relative to the side frames, as has sometimes been arranged. Moreover, it makes it unnecessary to operate the arm sliding means conjointly for sliding the arms axially together, as has sometimes been arranged. It will be realized that it is difficult to move the arms conjointly by separate power devices without the risk of changing the gripping pressure on the ends of the roll or even of dropping the roll.

It has already been explained that the side frame elements 30 are made separately from the rest of the mill roll stand side frames; also that the side frame elements 30 are rigidly secured together by the rigid tubular cross member 32. As herein provided, the slide frames are mounted for axial or transverse movement and each side frame is mounted for tilting movement about a longitudinal base pivot axis to accommodate such tilting as different roll loadings may impose while maintaining an even loading on the slidable base support. The tilting of the side frames is minimized by locating the cross beam 32 near the same height as the shaft 18 through which the loading is imposed, as the roll weight comes upon it.

As seen in FIG. 5, the front and rear ends of a side frame 30 are provided with supporting portions or feet 86 and thereunder there is provided floor-supported base plates 88 having transverse upstanding side flanges 90 with overhanging edges to retain the transverse slide flanges 92 of the feet 86.

As shown in FIGS. 3, 5 and 6, each of the feet 86 carries a foot pad or shoe 94 mounted on a longitudinal trunnion pin 96 secured in a cylindrical recess, as by a set screw 98, and having a head which retains the shoe. The base 88 is provided with a top track plate 100 and the shoe 94 is provided with a top track plate 102. Between them there is carried an assembly of supporting rollers 104 held in spaced alignment by side retaining plates 106. The rollers are retained at their ends by transverse depending flanges 108 of the shoe and are limited in transverse movement by depending stop plates 110 secured to the shoe by cap screws 112.

Means are provided for moving the connected side frame unit and holding it at fixed positions for accurate web side edge registry, the means herein shown comprising a fluid actuated power operating device (FIG. 3) having a cylinder 114 connected by a pivot 116 to a base anchorage 118 and a piston rod 120 connected by a pivot 122 to a bifurcated projection 124 secured to one of the side frame members 30.

By this arrangement all rollers of all sets are caused to take their full loading at all times regardless of any tilting of the side frames imposed by roll loadings.

It is thus seen that the invention provides a roll arm shaft support which utilizes a shorter shaft with less bending than usual and with uniform symmetrical bending about its center so that both arms slide with equal ease; also that the roll mounting provides for bending of the shaft on spherical bearing seats which obviate binding in long sleeve bearings in the side frames, thus avoiding shaft binding in such long bearings and side tilting of the side frames from such turning effects; and also that the side frames are united in a rigid unit with side adjustment to secure web side edge adjustment without changing the position of the roll shaft relative to the side frames and without shifting the arms along the shaft.

While one embodiment of the invention has been described for purposes of illustration it is to be understood that there may be various embodiments and modifications within the general scope of the invention.

We claim:
1. A roll lift shaft mounting, comprising in combination,
 transversely spaced and movable roll shaft side frames,
 means rigidly connecting said side frames together into a transversely movable roll shaft frame unit,
 support means for said frame unit providing transverse sliding movement for roll web side edge registry adjustment,
 power means for sliding and holding said frame unit in various adjusted positions,
 stub shafts carried by said side frames,
 a roll arm supporting shaft,
 and spherical joint bearings between each stub shaft and an end of said roll arm supporting shaft,
 one of said spherical joint bearings being axially fixed and the other providing axial movement between the roll arm supporting shaft and the side frame.
2. A roll shaft mounting as set forth in claim 1,
 wherein said frame support means comprises a sliding shoe mounted on a longitudinal trunnion to provide for tilting of the side frame under roll loading while maintaining full foot support on the base on which it slides.
3. A roll lift shaft mounting as set forth in claim 1,
 wherein said side frames are rigidly connected together by a beam disposed at a height near the height of said roll arm supporting shaft.

References Cited by the Examiner
UNITED STATES PATENTS

| | | | |
|---|---|---|---|
| 1,869,545 | 8/32 | Crafts | 242—58.6 |
| 2,031,618 | 2/36 | Robins | 308—20 |
| 2,991,953 | 7/61 | Moser et al. | 242—57.1 |
| 3,025,013 | 3/62 | Harding et al. | 242—58.3 |
| 3,057,571 | 10/62 | Aaron et al. | 242—58.6 |

MERVIN STEIN, *Primary Examiner.*

DONALD W. PARKER, *Examiner.*